US012731023B2

(12) United States Patent
Lan et al.

(10) Patent No.: US 12,731,023 B2
(45) Date of Patent: Sep. 8, 2026

(54) MACHINE-LEARNING BASED APPROACH FOR CLASSIFICATION OF ENCRYPTED NETWORK TRAFFIC

(71) Applicant: Fortinet, Inc., Sunnyvale, CA (US)

(72) Inventors: Jing Lan, Fremont, CA (US); Kan Xiao, San Jose, CA (US); Zhi Guo, San Jose, CA (US)

(73) Assignee: FORTINET, INC., Sunnyvale, CA (US)

( * ) Notice: Subject to any disclaimer, the term of this patent is extended or adjusted under 35 U.S.C. 154(b) by 923 days.

(21) Appl. No.: 16/827,902

(22) Filed: Mar. 24, 2020

(65) Prior Publication Data

US 2021/0303984 A1 Sep. 30, 2021

(51) Int. Cl.
*G06N 3/08* (2023.01)
*G06N 3/04* (2023.01)
(Continued)

(52) U.S. Cl.
CPC ................. *G06N 3/08* (2013.01); *G06N 3/04* (2013.01); *G06N 5/01* (2023.01); *G06N 5/04* (2013.01); *G06N 20/20* (2019.01); *H04L 63/0227* (2013.01); *H04L 63/0245* (2013.01); *H04L 63/16* (2013.01); *H04L 63/166* (2013.01); *H04L 63/168* (2013.01)

(58) Field of Classification Search
CPC .. G06N 3/08; G06N 3/04; G06N 5/01; G06N 5/04; G06N 20/20; G06N 3/0464; G06N 3/09; G06N 3/045; G06N 7/01; G06N 20/00; G06N 3/0454; G06N 7/005; H04L 63/0227; H04L 63/0245; H04L 63/16; H04L 63/166; H04L 63/168; H04L 63/0428
See application file for complete search history.

(56) References Cited

U.S. PATENT DOCUMENTS 10,410,127 B2 * 9/2019 Christodorescu ...... G06N 5/022
10,452,995 B2 * 10/2019 Burger .................. G06N 20/00
(Continued)

OTHER PUBLICATIONS

Masadeh, M., Hasan, O., & Tahar, S. (2019). Input-conscious approximate multiply-accumulate (mac) unit for energy-efficiency. IEEE Access, 7, 147129-147142. (Year: 2019).*
(Continued)

*Primary Examiner* — Omar F Fernandez Rivas
(74) *Attorney, Agent, or Firm* — Jaffery Watson Hamilton & DeSanctis LLP

(57) ABSTRACT

Systems and methods for a machine-learning based approach for classification of encrypted network traffic data are provided. According to various embodiment of the present disclosure, a network security device receives a stream of packets representing a network flow. Metadata relating to the stream of packets is determined. Application layer payload data of one or more packets of the stream of packets is matched against string patterns and regular expression patterns. Statistics relating to the application layer payload data are collected. The network flow is then classified as being associated with a particular network service of various network services by applying a machine-learning model to the metadata, results of the matching, and the collected statistics.

24 Claims, 10 Drawing Sheets

(51) Int. Cl.

| | |
|---|---|
| ***G06N 5/01*** | (2023.01) |
| ***G06N 5/04*** | (2023.01) |
| ***G06N 20/20*** | (2019.01) |
| ***H04L 9/40*** | (2022.01) |

(56) References Cited

U.S. PATENT DOCUMENTS

| | | | | |
|---|---|---|---|---|
| 2004/0049596 | A1* | 3/2004 | Schuehler | H04L 69/16 709/231 |
| 2007/0088845 | A1* | 4/2007 | Memon | H04L 47/10 709/234 |
| 2019/0044868 | A1* | 2/2019 | Kfir | H04L 12/2898 |
| 2019/0297096 | A1* | 9/2019 | Ahmed | H04L 63/1441 |
| 2019/0370218 | A1* | 12/2019 | Di Pietro | H04L 41/16 |
| 2020/0120107 | A1* | 4/2020 | McGrew | G06N 20/00 |
| 2020/0382527 | A1* | 12/2020 | Mitelman | G06N 20/20 |
| 2020/0394463 | A1* | 12/2020 | Marwah | G06N 3/09 |
| 2022/0076666 | A1* | 3/2022 | Trehan | G06V 10/82 |
| 2023/0075634 | A1* | 3/2023 | Fathieh | A61B 5/349 |

OTHER PUBLICATIONS

Lopez-Martin, M., Carro, B., Sanchez-Esguevillas, A., & Lloret, J. (2017). Network traffic classifier with convolutional and recurrent neural networks for Internet of Things. IEEE access, 5, 18042-18050. (Year: 2017).*

Zhou, K., Wang, W., Wu, C., & Hu, T. (2020). Practical evaluation of encrypted traffic classification based on a combined method of entropy estimation and neural networks. ETRI Journal, 42(3), 311-323. (Year: 2020).*

Ni, Z., Liu, G., Afanasev, D., Wood, T., & Hwang, J. (Jul. 2019). Advancing network function virtualization platforms with programmable NICs. In 2019 IEEE International Symposium on Local and Metropolitan Area Networks (LANMAN) (pp. 1-6). IEEE. (Year: 2019).*

Wei, X. (Apr. 2019). Design and Implementation of a Lightweight Intrusion Detection and Prevention System. In International Conference on Security and Privacy in New Computing Environments (pp. 433-439). Springer, Cham. (Year: 2019).*

Gómez, S. E., Martínez, B. C., Sánchez-Esguevillas, A. J., & Callejo, L. H. (2017). Ensemble network traffic classification: Algorithm comparison and novel ensemble scheme proposal. Computer Networks, 127, 68-80. (Year: 2017).*

Shire et al., "Malware Squid: A Novel IoT Malware Traffic Analysis Framework Using Convolutional Neural Network and Binary Visualisation", 2019, Internet of Things, Smart Spaces, and Next Generation Networks and Systems. NEW2AN ruSMART 2019, pp. 65-76 (Year: 2019).*

Anderson et al., "Identifying Encrypted Malware Traffic with Contextual Flow Data", 2016, Proceedings of the 2016 ACM Workshop on Artificial Intelligence and Security, vol. 2016, pp. 35-46 (Year: 2016).*

Zhou et al., "Practical evaluation of encrypted traffic classification based on a combined method of entropy estimation and neural networks," Jan. 2020, ETRI Journal, vol. 42(3), pp. 311-323 (Year: 2020).*

Deri et al., "nDPI: Open-source high-speed deep packet inspection", 2014, 2014 International Wireless Communications and Mobile Computing Conference (IWCMC), vol. 2014, pp. 617-622 (Year: 2014).*

Barbareschi et al., "Malicious Traffic Analysis on Mobile Devices: a Hardware Solution", 2009 (Year: 2009).*

Yang et al., "Bayesian Neural Network Based Encrypted Traffic Classification using Initial Handshake Packets", 2019, 2019 49th Annual IEEE/IFIP International Conference on Dependable Systems and Networks—Supplemental Volume (DSN-S), vol. 4, pp. 19-20 (Year: 2019).*

Wang, Pan et al., IEE Acess, vol. 6, "Datanet: Deep Learning Based Encrypted Network Traffic Classification in SDN Home Gateway", Oct. 19, 2018, 12 pages.

Rezaei, Shahbaz et al., Bee Communications Magazine, "Deep Learning for Encrypted Traffic Classification: An Overview", Mar. 9, 2019, 9 pages.

Egea, Santiago et al., Computer Networks, "Ensemble Network Traffic Classification: Algorithm Comparison and Novel Ensemble Scheme Proposal", Aug. 2017, 14 pages.

Zhou, Kun et al., ETRI Journal, vol. 42, Issue 3, "Practical evaluation of encrypted traffic classification based on a combined method of entropy estimation and neural networks", Jan. 14, 2020, 32 pages.

* cited by examiner

Network Security Device
102

Processor(s)
202

Memory
204

Interface(s)
206

Processing Engine
208

Packets Stream Receiving Engine
212

Metadata Determination Engine
214

Payload Data Matching Engine
216

Statistics Collection Engine
218

Network Flow Classification Engine
220

Other Engine(s)
222

Database
210

MACHINE-LEARNING BASED APPROACH FOR CLASSIFICATION OF ENCRYPTED NETWORK TRAFFIC

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright 2020, Fortinet, Inc.

BACKGROUND

Field

Embodiments of the present invention generally relate to network security and network traffic monitoring and classification. In particular, embodiments of the present invention relate to a machine-learning based approach to classify encrypted network traffic data.

Description of the Related Art

Network traffic classification techniques are used for a variety of applications, including implementing quality of service (QoS) control, pricing, resource usage planning, malware detection, and intrusion detection. Many network traffic classification mechanisms employ deep packet inspection (DPI) in which layer seven (application layer) payload information of the Open Systems Interconnection (OSI) model is matched against string patterns and regular expression patterns. Many intrusion prevention system (IPS) appliance and load balancing appliances use these mechanisms.

DPI is computationally intensive and when processing encrypted network traffic, event more computing power is required. Meanwhile, in certain instances, decryption of the encrypted traffic is not feasible. For example, an enterprise customer may not wish to share with the network security vendor, and therefore the encrypted traffic cannot be classified through DPI.

SUMMARY

Systems and methods are described for a machine-learning based approach for classification of encrypted network traffic data. According to one embodiment, a stream of packets representing a network flow is received by a processor of a network security device. Metadata relating to the stream of packets is determined by the processor. Application layer payload data of one or more packets of the stream of packets is matched against string patterns and regular expression patterns by the processor or by a pattern matching and regular expression matching module of a hardware acceleration sub-system of the network security device. Statistics relating to the application layer payload data are collected by the processor or by the hardware acceleration sub-system. The network flow is classified by the processor as being associated with a particular network service of multiple of network services by applying a machine-learning model to the metadata, results of said matching, and the collected statistics.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1A:
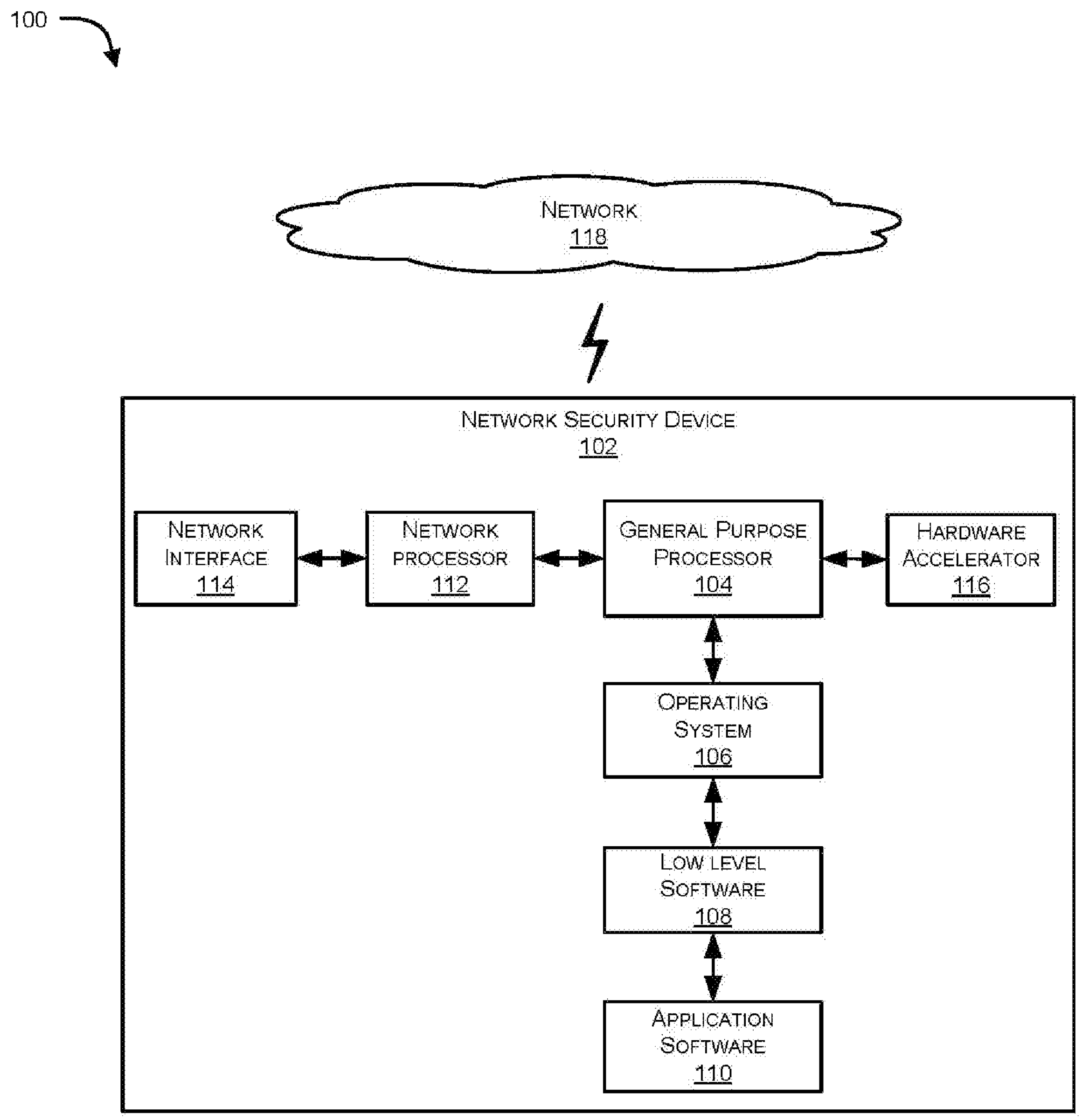
FIG. 1A is a block diagram illustrating an exemplary architecture of a network security device in which aspects of the present invention may be implemented in accordance with an embodiment of the present invention.

Systems and methods are described for a machine-learning based approach for classification of encrypted network traffic data. In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein, a "network security appliance" or a "network security device" generally refers to a device or appliance in virtual or physical form that is operable to perform one or more security functions. Some network security devices may be implemented as general-purpose computers or servers with appropriate software operable to perform the one or more security functions. Other network security devices may also include custom hardware (e.g., one or more custom Application Specific Integrated Circuits (ASICs)). A network security device is typically associated with a particular network (e.g., a private enterprise network) on behalf of which it provides the one or more security functions. The network security device may reside within the particular network that it is protecting or network security may be provided as a service with the network security device residing in the cloud. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VOIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), and DoS attack detection appliances (e.g., the FORTIDDoS family of DoS attack detection and mitigation appliances).

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

Systems and methods for a machine-learning based approach for classification of encrypted network traffic data are provided. According to various example embodiments, a processor of a network security device receives a stream of packets representing a network flow. The processor determines metadata relating to the stream of packets. The processor or a pattern matching and regular expression matching module of a hardware acceleration sub-system of the network security device matches application layer payload data of one or more packets of the stream of packets against string patterns and regular expression patterns. The processor or the hardware acceleration sub-system collects statistics relating to the application layer payload data. The processor then classifies the network flow as being associated with a particular network service of various network services by applying a machine-learning model to the metadata, results of the matching, and the collected statistics.

FIG. 1A is a block diagram 100 illustrating an exemplary architecture of a network security device 102 in which aspects of the present invention may be implemented in accordance with an embodiment of the present invention. In the context of present example, a network security device 102 (e.g., a firewall appliance, a UTM appliance, an IDS/IPS, or the like) include a network interface 114 that can act as a point of interconnection between network security device 102 and a network 118. Network 118 can be a dedicated network or a shared network. A shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

Network interface 114 can be operatively coupled to a network processor 112 for processing internet traffic and executing network applications. Network processor 112 can be operatively coupled to general purpose processor 104 for running compute-intensive applications at issue. General purpose processor 104 can run an operating system 106 for managing various resources and interfaces. Further, operating system 106 can run a program or group of programs designed for end users. A non-limiting example of operating system 106 is the FORTIOS network operating system, which is available from the assignee of the present invention.

These programs can be divided into two classes: low level software 108 and application software 110. While low level software 108 includes low-level programs that interact with computing devices at a basic level, application software 110 resides above system software and may include applications such as database programs, network security functionality and the like.

According to an embodiment, network security device 102 further includes a hardware accelerator 116, which is controlled by the general purpose processor 104. The hardware accelerator 116 may be used for hardware accelerating certain compute-intensive functions, such as those involving pattern matching and/or regular expression matching. Hardware accelerator 116 is operatively coupled to general purpose processor 104 and includes a hardware acceleration sub-system. The hardware acceleration sub-system is operable to perform pattern matching and regular expression matching of application layer payload data of received packets against string patterns and regular expression patterns. Further, the hardware acceleration sub-system may collect statistics relating to application layer payload data. In embodiments in which hardware accelerator 116 is employed, it may decrease latency and increase throughput of general purpose processor 104. In addition hardware accelerator 116 may be used to perform various functionalities such as intrusion prevention pattern matching, firewall policy search pattern matching, applications' pattern matching and the like.

In an embodiment, general purpose processor 104 is responsible for performing classification of encrypted network traffic. Depending upon the particular implementation, the entire classification process may be performed in software or some portions of the process may be hardware accelerated. For example, the general purpose processor 104 may receive a stream of packets representing a network flow. The general purpose processor 104 may further determine metadata relating to the stream of packets and classifies the network flow as being associated with a particular network service of various network services. Application layer payload data of one or more packets of the stream of packets may be matched against string patterns and regular expression patterns by the general purpose processor 104 or by a pattern matching and regular expression matching module (not shown) of a hardware acceleration sub-system of the network security device 102. Statistics relating to the application layer payload data may be collected by the general purpose processor 104 or by the hardware acceleration sub-system. The network flow may then be classified by the general purpose processor 104 as being associated with a particular network service of multiple of network services by applying a machine-learning model to the metadata, results of said matching, and the collected statistics.

As described further below, in an embodiment, the machine-learning module (not shown) includes a decision tree based module, a logistic regression module, and a neural network module. In yet another embodiment, the hardware acceleration sub-system includes a decision tree co-processor, a multiply-accumulate co-processor, and a lookup table co-processor. The multiply-accumulate co-processor may be shared by the logic regression module and the neural network module. Further, network security device 102 may include an intrusion detection module (not shown). The intrusion detection module may be responsible for performing intrusion detection functionality and may make use of the results of pattern matching and regular expression matching to perform the intrusion detection functionality. For purposes of efficiency, hardware accelerator 116 may be partially shared between functions handling encrypted network traffic and unencrypted network traffic.

Figure 1B:
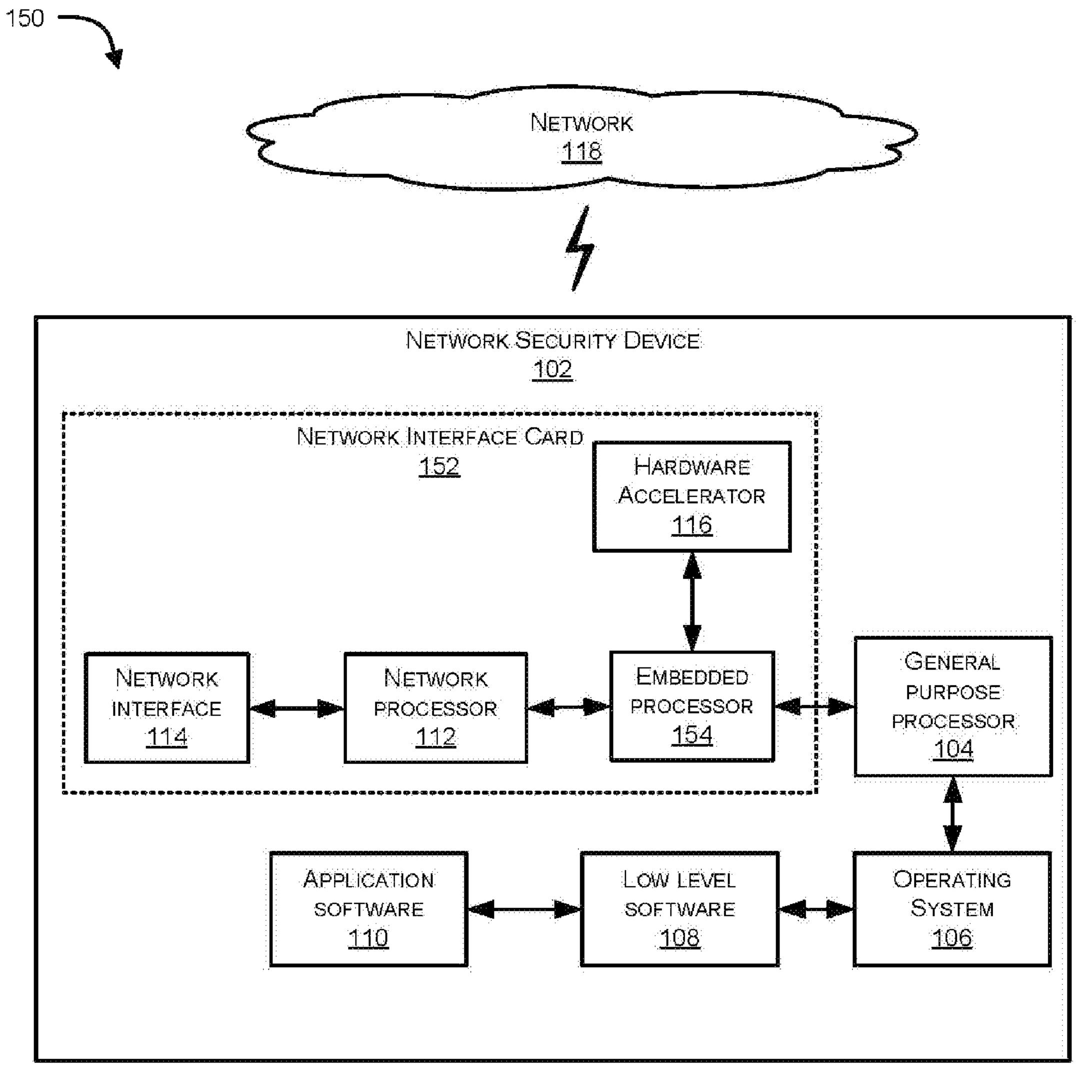
FIG. 1B is a block diagram illustrating an exemplary architecture of a network security device with a network interface card in accordance with an embodiment of the present invention.

FIG. 1B is a block diagram 150 illustrating an exemplary architecture of a network security device 102 with a network interface card (NIC) 152 in accordance with an embodiment of the present invention. In the context of the present example, network security device 102 may include operating system 106, low level software 108 and application software 110 as described above with reference to FIG. 1A. However, in the present example, hardware accelerator 116 may be implemented within NIC 152 so as to allow the hardware acceleration functionality to be used by general purpose processor 104 as well as other devices that may be co-located in a data center, for example, with the network security device 102. Further, NIC 152 may provide traffic classification services to other host systems or network nodes operatively coupled with the NIC without using processing resources of the general purpose processor 104.

Depending upon the particular implementation, NIC 152 may be in the form of a discrete device that can be interfaced or operatively coupled with general purpose processor 104 and can be used to provide hardware acceleration on behalf of the general purpose processor 104, which may involve, among other things, performing pattern matching and regular expression matching.

According to an embodiment, embedded processor 154 of NIC 152 is operatively coupled with the hardware accelerator 116 and with the general purpose processor 104. NIC 152 may further include network interface 114 that receives network traffic, and a network processor 112 that processes a network flow.

Hardware accelerator 116 can be configured to perform pattern matching and regular expression matching of application layer payload data associated with a received stream of packets against string patterns and regular expression patterns.

Figure 2:
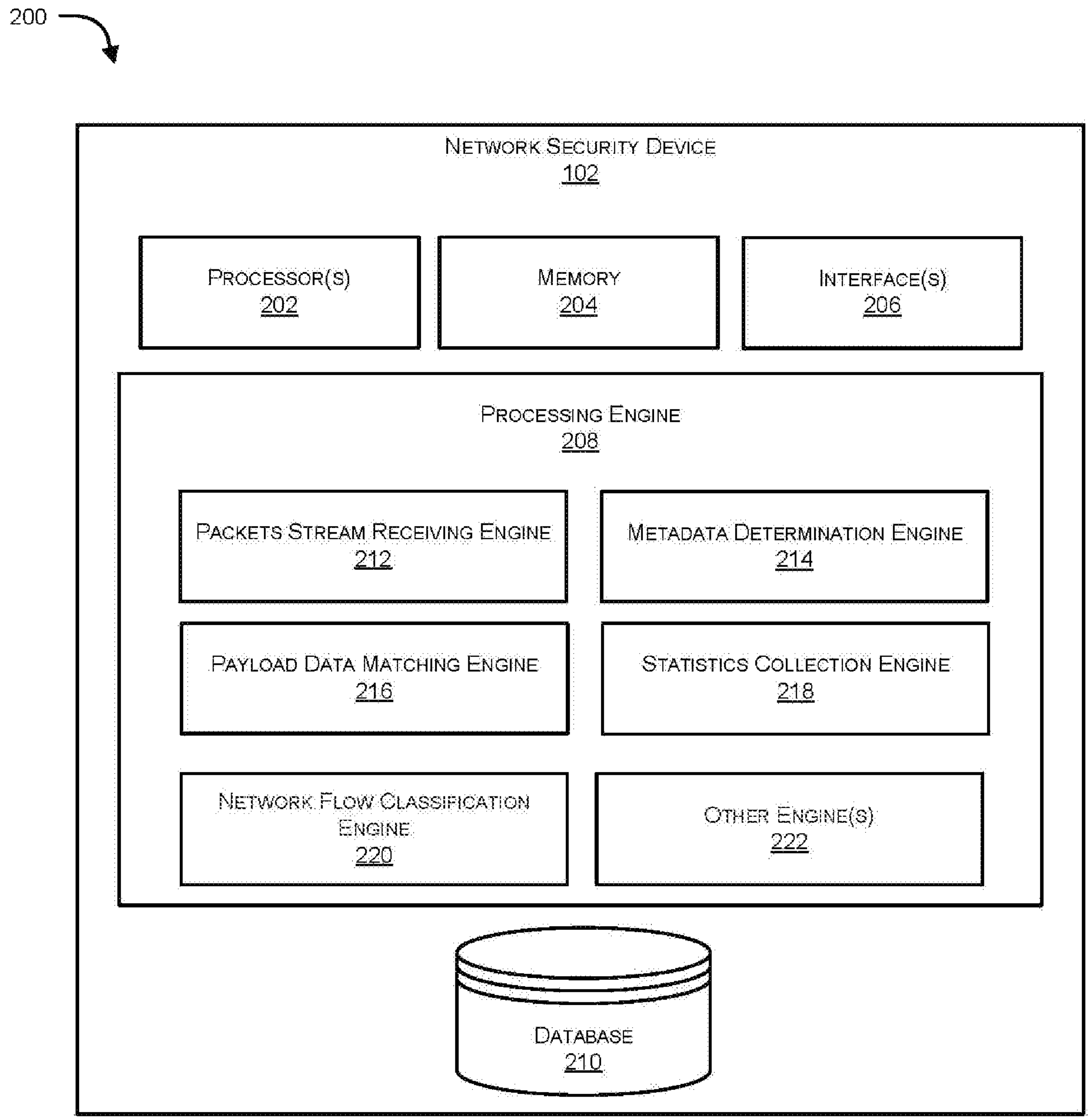
FIG. 2 is a block diagram illustrating functional components of a network security device in accordance with an embodiment of the present invention.

FIG. 2 is a block diagram illustrating functional components of a network security device 102 in accordance with an embodiment of the present invention. In the context of the present example, network security device 102 can include one or more processing resources (e.g., processor(s) 202). Processor(s) 202 can be implemented as one or more microprocessors, microcomputers, microcontrollers, digital signal processors, central processing units, logic circuitries, and/or any devices that manipulate data based on operational instructions. Among other capabilities, processor(s) 202 are configured to fetch and execute computer-readable instructions stored in a memory 204 of the network security device 102. Memory 204 can store one or more computer-readable instructions or routines, which may be fetched and executed to create or share the data units over a network service. Memory 204 can include any non-transitory storage device including, for example, volatile memory such as RAM, or non-volatile memory such as EPROM, flash memory, and the like. In an example embodiment, memory 204 may be a local memory or may be located remotely, such as a server, a file server, a data server, and the Cloud.

Network security device 102 can also include one or more Interface(s) 206. Interface(s) 206 may include a variety of interfaces, for example, interfaces for data input and output devices, referred to as I/O devices, storage devices, and the like. Interface(s) 206 may facilitate communication of network security device 102 with various devices coupled to network security device 102. Interface(s) 206 may also provide a communication pathway for one or more components of network security device 102. Examples of such components include, but are not limited to, processing engine(s) 208 and database 210.

Processing engine(s) 208 can be implemented as a combination of hardware and software or firmware programming (for example, programmable instructions) to implement one or more functionalities of engine(s) 208. In the examples described herein, such combinations of hardware and software or firmware programming may be implemented in several different ways. For example, the programming for the engine(s) 208 may be processor executable instructions stored on a non-transitory machine-readable storage medium and the hardware for engine(s) 208 may include a processing resource (for example, one or more processors), to execute such instructions. In the examples, the machine-readable storage medium may store instructions that, when executed by the processing resource, implement engine(s) 208. In such examples, network security device 102 can include the machine-readable storage medium storing the instructions and the processing resource to execute the instructions, or the machine-readable storage medium may be separate but accessible to network security device 102 and the processing resource. In other examples, processing engine(s) 208 may be implemented by electronic circuitry. Database 210 can include data that is either stored or generated as a result of functionalities implemented by any of the components of processing engine(s) 208.

In an example, processing engine(s) 208 can include a packets stream receiving engine 212, a metadata determination engine 214, a payload data matching engine 216, a statistics collection engine 218, a network flow classification engine 220, and other engine(s) 222. Other engine(s) 222 can implement functionalities that supplement applications or functions performed by network security device 102 or processing engine(s) 208.

According to an embodiment, packets stream receiving engine 212 can receive a stream of packets that represent a network flow. Metadata determination engine 214 can determine metadata that is related to the received stream of packets. The metadata can include any or a combination of a packet size sequence, an arrival interval sequence, an Internet Protocol (IP) family, and a layer four protocol associated with the network flow. In addition, the metadata can include any or a combination of a destination port specified by the layer four protocol, Transport Layer Security (TLS) records, and TLS hello message lengths. The packet size sequence can include sizes of an application layer payload for a predetermined number of initial packets of the network flow.

Payload data matching engine 216 is responsible for match application layer payload data of one or more packets of the stream of packets against string patterns and regular expression patterns. Depending upon the particular implementation, payload data matching engine 216 may be implemented in software and/or by a pattern matching and regular expression matching module of a hardware acceleration sub-system of the network security device 102.

Statistics collection engine 218 is responsible for collecting statistics relating to the application layer payload data. Depending upon the particular implementation, statistics collection engine 218 may be implemented in software and/or by a statistics collection module of a hardware acceleration sub-system of the network security device 102.

Network flow classification engine 220 is responsible for classifying the network flow as being associated with a particular network service by applying a machine-learning model (not shown) to the metadata, results of the matching, and the collected statistics. The machine learning engine can include one or more of a decision tree model, a logistic regression model, and a neural network model. In one embodiment, an output layer of the machine learning engine can output a classification of the network flow. The classification may be performed based on a decision tree model alone or based on a combination of multiple machine learning models (e.g., a decision tree model, a logistic regression model, and a neural network model) that form the internal layers of the machine learning engine. For example, the outputs of the various models may be combined, selected, and/or weighted based on their respective confidence scores.

Figure 3:
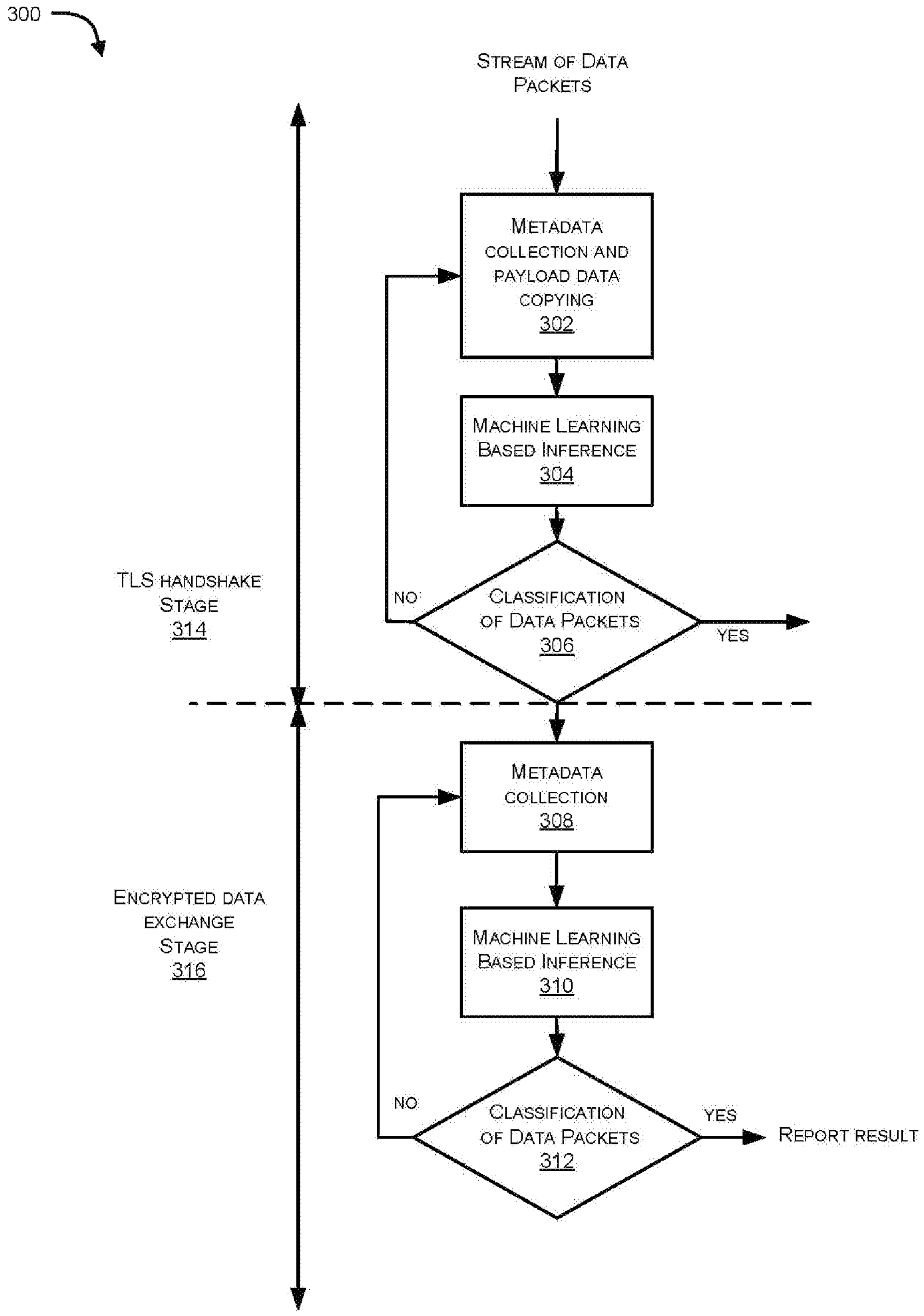
FIG. 3 is a high-level flow diagram illustrating traffic classification processing in accordance with an embodiment of the present invention.

FIG. 3 is a high-level flow diagram 300 illustrating traffic classification processing in accordance with an embodiment of the present invention. In the context of the present example, a network flow is generally represented in two stages, a TLS handshake stage 314 and an encrypted data exchange stage 316. During the TLS handshake stage 314, at block 302, responsive to receipt of a stream of data packets, the network security device collects metadata and copies unencrypted payload data to local memory. According to one embodiment, metadata for the network flow is collected on a packet-by-packet basis. Table 1 illustrates non-limiting examples of metadata that may be collected.

At block 304, a machine learning based inference can be performed. According to one embodiment, the inference can be performed by a machine learning engine using the collected metadata and the copied payload data. An example of a machine learning engine that may be used in an embodiment is described further below with reference to FIG. 4.

At decision block 306, it is determined whether sufficient information exists to perform an accurate classification of the network flow at issue. For example, the confidence of the machine learning based inference performed at block 304 may be compared to a threshold. If the classification is successful at this point, then processing is complete and the classification result may be reported; otherwise, processing loops back to block 302 to continue to collect additional metadata and packet payloads.

According to one embodiment, when the network flow has not been able to be accurately classified and the TLS handshake stage 314 has been completed and the network flow commences the encrypted data exchange stage 316, then processing continues with block 308

At block 308, further metadata collection may take place. Non-limiting examples of metadata that may be collected are listed in Table 1 below.

At block 310, machine learning based inference can be performed based on the additional metadata collection performed at block 308. According to one embodiment, the machine learning based inference is based on the current collected metadata during the encrypted data exchange stage 316 as well as the previously stored TLS handshake packet payload data collected during the TLS handshake stage 314. An example of a machine learning engine that may be used in an embodiment is described further below with reference to FIG. 4.

At decision block 312, it is determined whether sufficient information exists to perform an accurate classification of the network flow at issue. For example, the confidence of the machine learning based inference performed at block 310 may be compared to a threshold. If the classification is successful at this point, then processing is complete and the classification result may be reported; otherwise, processing loops back to block 308 to continue to collect additional metadata. Depending upon the particular implementation, during the encrypted data exchange stage 316 classification processing (e.g., blocks 308, 310 and 312) may continue until a predefined iteration threshold is reached or until a satisfactory classification result is produced.

TABLE 1

Examples of Metadata

| Metadata | Description |
|---|---|
| Packet size sequence | The first N packets' payload sizes. |
| Arrival interval sequence | The first N packets' arrival intervals. |
| IP family | IP version 4 or IP version 6. |
| Layer four protocol | Transport layer protocol. |
| Layer four destination port | For TCP and UDP, the destination port. |
| TLS records | TLS version, content type, etc. |
| TLS Hello message lengths | The Hello message lengths from the client and the server |

Figure 4:
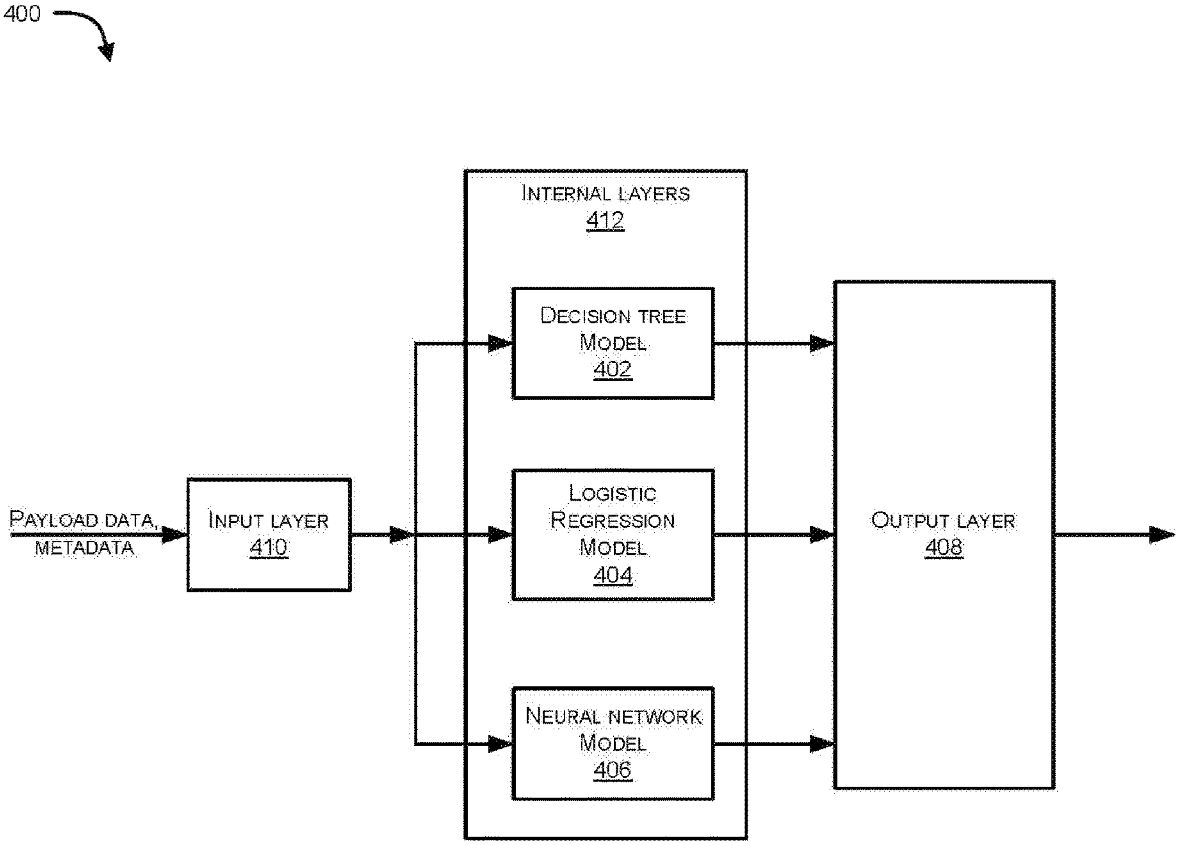
FIG. 4 is a block diagram illustrating components of a machine-learning based inference engine in accordance with an embodiment of the present invention.

FIG. 4 is a block diagram illustrating components of a machine-learning based inference engine 400 in accordance with an embodiment of the present invention. In the context of the present example, the machine-learning based inference engine 400 includes an input layer 410, internal layers 412, and an output layer 408. The input layer 410 may be responsible for receiving payload data and metadata (e.g., the payload data and the metadata collected during the TLS handshake stage 314 and the encrypted data exchange stage as described with reference to FIG. 3) as input. The input layer 410 may perform various preprocessing on the received payload data and the metadata to generate all or a portion of the feature vectors input to the internal layers 412. For example, the input layer may be responsible for performing one or more of string matching, regular expression matching and statistics collection, the results of which may represent all or a part of the feature vectors. Table 2 provides non-limiting examples of regular expression and a string matching patterns that may be employed.

The internal layers 412 may be responsible for performing the machine-learning based inference and may make use of one or more machine learning models. In the context of the present example, the internal layers 412 include a decision tree model 402, a logistic regression model 404, and a neural network model 406. The neural network model may be a Deep Neural Network (DNN) model, a Convolutional Neural Network (CNN) model, or a Recurrent Neural Network (RNN) model. The machine learning models implemented within the internal layers 412 are independently applied to the output of the input layer 410 (e.g., results of pattern matching and/or regular expression matching and statistic collection) and/or the collected metadata to produce separate classification results. As noted above and explained herein, the machine-learning based inference engine can be executed on a general purpose processor, and can be accelerated by a hardware accelerator.

The output layer 408 is responsible for receiving the outputs from the internal layers 412 and generating a final classification result for the network flow. In accordance with one embodiment, the entire inference (e.g., blocks 410, 412 and 408) is executed by one or more general purpose processors. In accordance with another embodiment, the inference or some portion thereof may be accelerated by hardware. In one embodiment, the final classification result for the network flow is a weighted combination of the models 402, 404, and 406 based on their respective confidence scores. Alternatively, one of the outputs of models 402, 404, and 406 may be selected based on their respective confidence scores.

While in the context of the present example, three specific machine-learning based models are described as being used to perform network flow classification, in alternative embodiments, more or fewer machine-learning based models may be employed. Similarly, as will be appreciated by those skilled in the art, various alternative machine learning models may be used. Additionally, in some embodiments, separate classifiers may be used for each type and/or version of encryption.

TABLE 2

Examples of String Matching and RegEx Patterns

| Patterns | Description |
|---|---|
| "example\..*\.com" | In server name extension |
| "oxc02c" | In cipher suite extension |
| "ox0601" | In signature algorithms extension |

Figure 5:
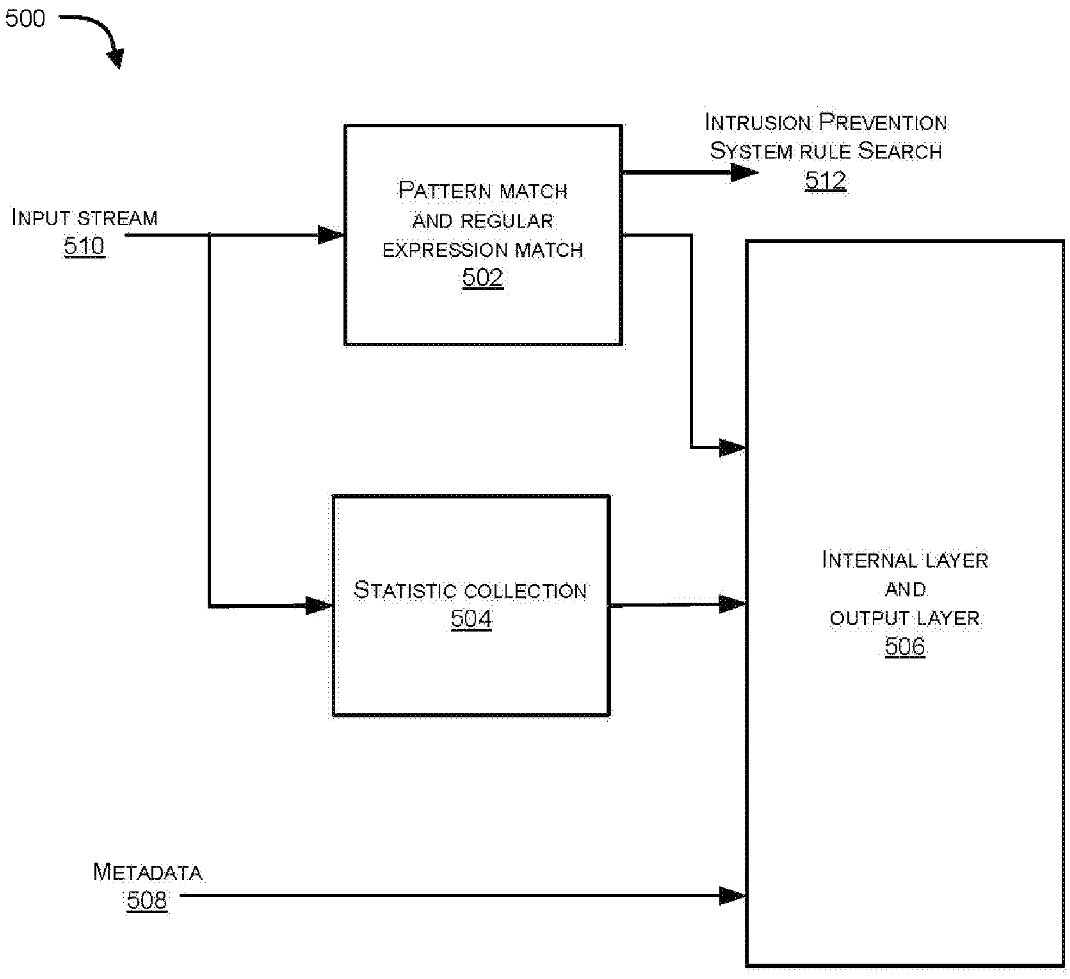
FIG. 5 is a high-level block diagram illustrating components of a hardware accelerator in accordance with an embodiment of the present invention.

FIG. 5 is a high-level block diagram illustrating components of a hardware accelerator 500 in accordance with an embodiment of the present invention. In the context of the present example, the hardware accelerator 500 includes a pattern matching and regular expressing matching module 502, a statistics collection module 504 and internal and output layers 506 (which may generally correspond to internal layers 412 and output layer 408 of FIG. 4). An example of an architecture of internal and output layers 506 is described further below with reference to FIG. 6.

The pattern matching and regular expression matching module 502 and the statistic collection module 504 may be responsible for preprocessing the input stream of packets 510 to produce all or a portion of the feature vectors input into the internal and output layers 506. For example, the pattern matching and regular expression matching module 502 may perform pattern matching and regular expression matching on the received stream of packets (e.g., their respective payloads) and produce Boolean results for the various patterns (e.g., those listed in Table 2). Statistics collection module 504 may calculate the frequency of ASCII characters or ASCII character ranges occurring within the received stream of packets 510. In the context of the present example, the feature vector input to the internal and output layers 506 includes the output of the pattern matching and regular expression matching module 502, the output of the statistics collection module 504 and metadata 508 (see, e.g., Table 1).

In an embodiment, efficiencies can be achieved by sharing the pattern matching and regular expression matching module 502 with other traffic classification functionality and/or IDS/IPS functionality implemented by the network security device (e.g., Intrusion Prevention System (IPS) rule search 512 for providing IPS services and traffic classification services on unencrypted traffic).

Figure 6:
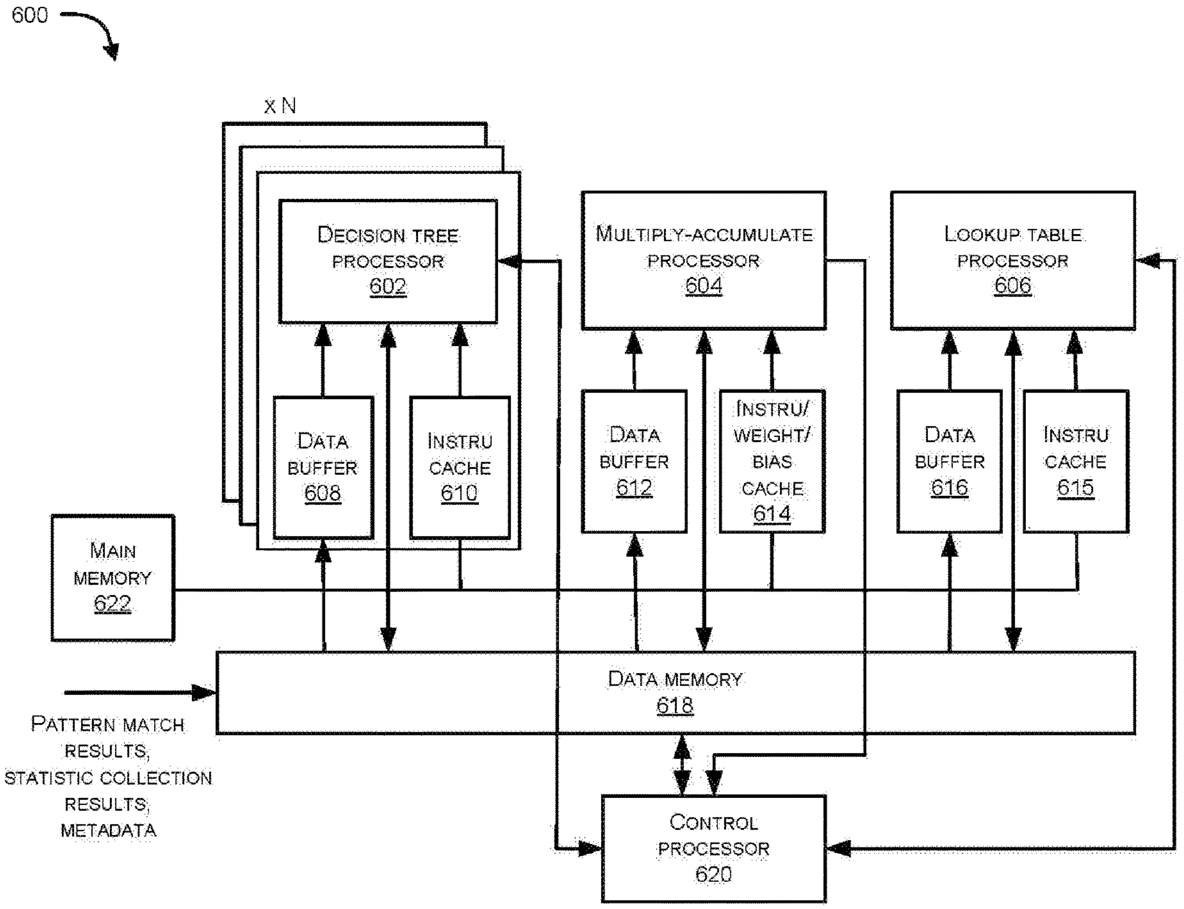
FIG. 6 is a block diagram illustrating an architecture of an internal layer and an output layer of a hardware accelerator in accordance with an embodiment of the present invention.

FIG. 6 is a block diagram illustrating an architecture of an internal layer and an output layer of a hardware accelerator 600 in accordance with an embodiment of the present invention. In the context of the present example, the hardware accelerator 600 includes a control processor 620, a main memory 622, a data memory 618, multiple co-processors (e.g., one or more decision tress processors 602, a multiply-accumulate (MAC) processor 604, a lookup table (LUT) processor 606), and corresponding data buffers 608, 612, and 616 and instruction caches 610, 614, and 615.

Control processor 620 may be operable to execute general purpose instructions to control the co-processors as well as resolving data dependency issues that may arise among the co-processors.

Data memory 618 can receive as input, pattern matching results, statistics collection results and metadata received from an input layer (e.g., input layer 410). The received input can be presented in data memory 618 in form of either vectors or scalars, and can be loaded initially to respective co-processor's data buffers 608, 612, and 616, before being used. Thus, data memory 618 can serve as a write destination for the co-processors' intermediate and final result data. In an embodiment, multiple identical decision tree co-processors 602 may be used that support general purpose instructions and decision tree extension instructions.

MAC co-processor 604 may support general purpose instructions and vector MAC extension instructions. Cache 614 may be provided for maintaining instructions, weights, bias, and cache for the MAC co-processor 604. The MAC co-processor 604 may facilitate execution and computation associated with a logistic regression model (e.g., logistic regression model 404), neural network model (e.g., neural network model 406), and an output layer (e.g., output layer 408). In another embodiment, the lookup table (LUT) co-processor 606 supports general purpose instructions and vector LUT extension instructions (e.g., softmax, sigmoid, and tanh). The architecture of the internal layer and the output layer of the hardware accelerator can be additionally supported by the main memory 622 that acts as a supporting block between the multiple co-processors and the data memory 618 connected to the control processor 620.

Figure 7:
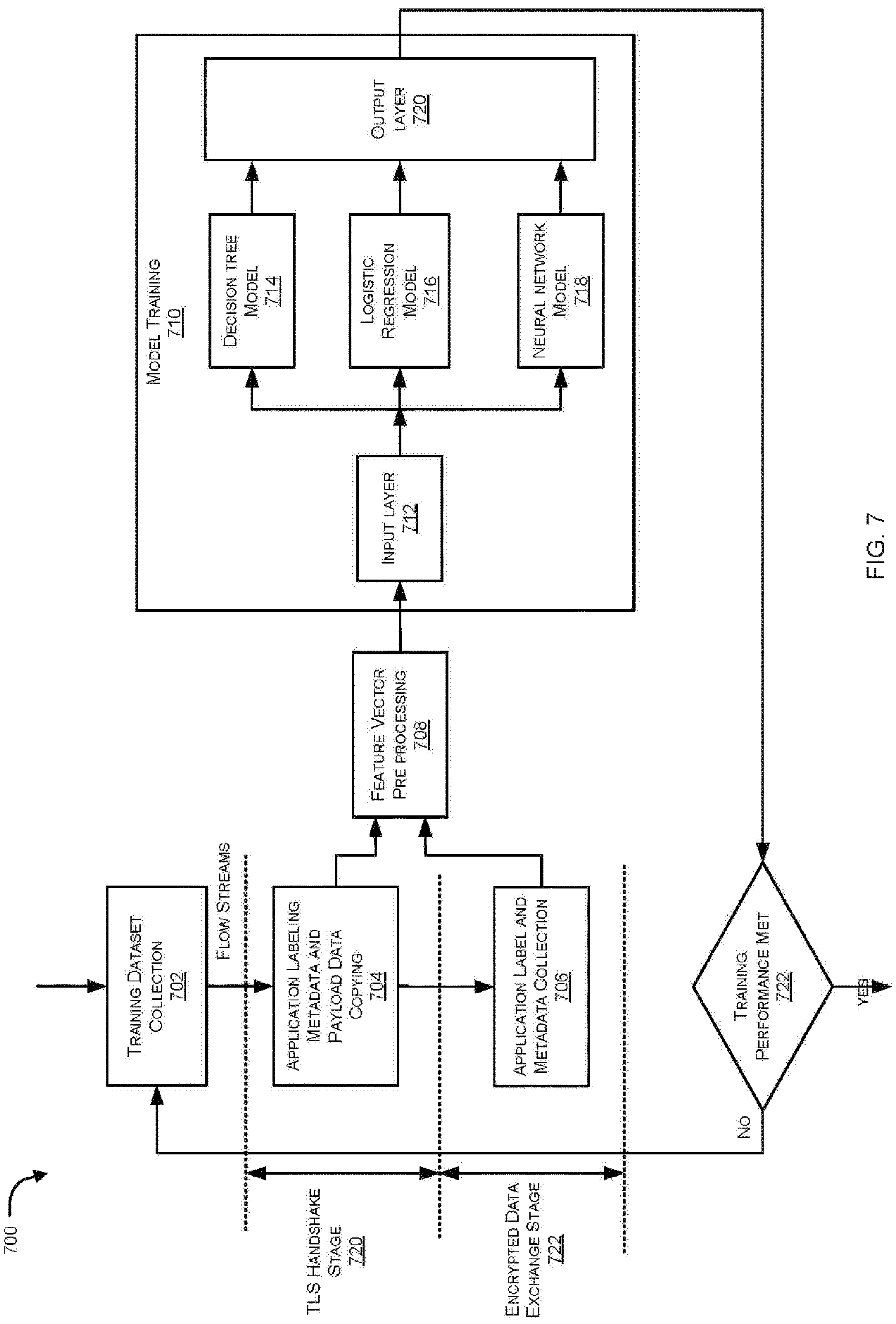
FIG. 7 is a flow diagram illustrating training processing in accordance with an embodiment of the present invention.

FIG. 7 is a flow diagram illustrating training processing in accordance with an embodiment of the present invention. In an embodiment, when selected features from a network traffic flow are extracted at TLS handshake stage 720 and encrypted data exchange stage 722, the network security device can pre-process raw features to produce feature vectors. The raw features correspond to training dataset collection 702, application labeling metadata and payload data copying 704, and application label and metadata collection 706. The feature vectors can be determined at feature vector pre-processing 708 and the feature vectors that are found suitable for training or inference can be elevated to a next stage and can be used as input by model training 710. Depending upon the particular implementation, one or more techniques may be used to optimize the features for achieving classification improvement, hence leading to cost-saving, e.g., dimension reduction, message reconstruction, etc. Further, data normalization and standardization techniques can be applied to feature vectors during feature vector pre-processing 708.

In an embodiment, at model training 710, feature vectors can be received as input at input layer 712. The received feature vectors can be fed to each of a respective decision tree model 714, a logic regression model 716, and a neural network model 718, for training the feature vectors. The trained feature vectors are then received at output layer 720. As can be appreciated by those skilled in the art, the output obtained from model training 710 can be evaluated for determining whether training performance is met at 722. When the desired training performance (e.g., classification accuracy) is met, the feature vectors are considered trained for further reference and use, otherwise steps to collect additional training data sets can be performed.

Figure 8:
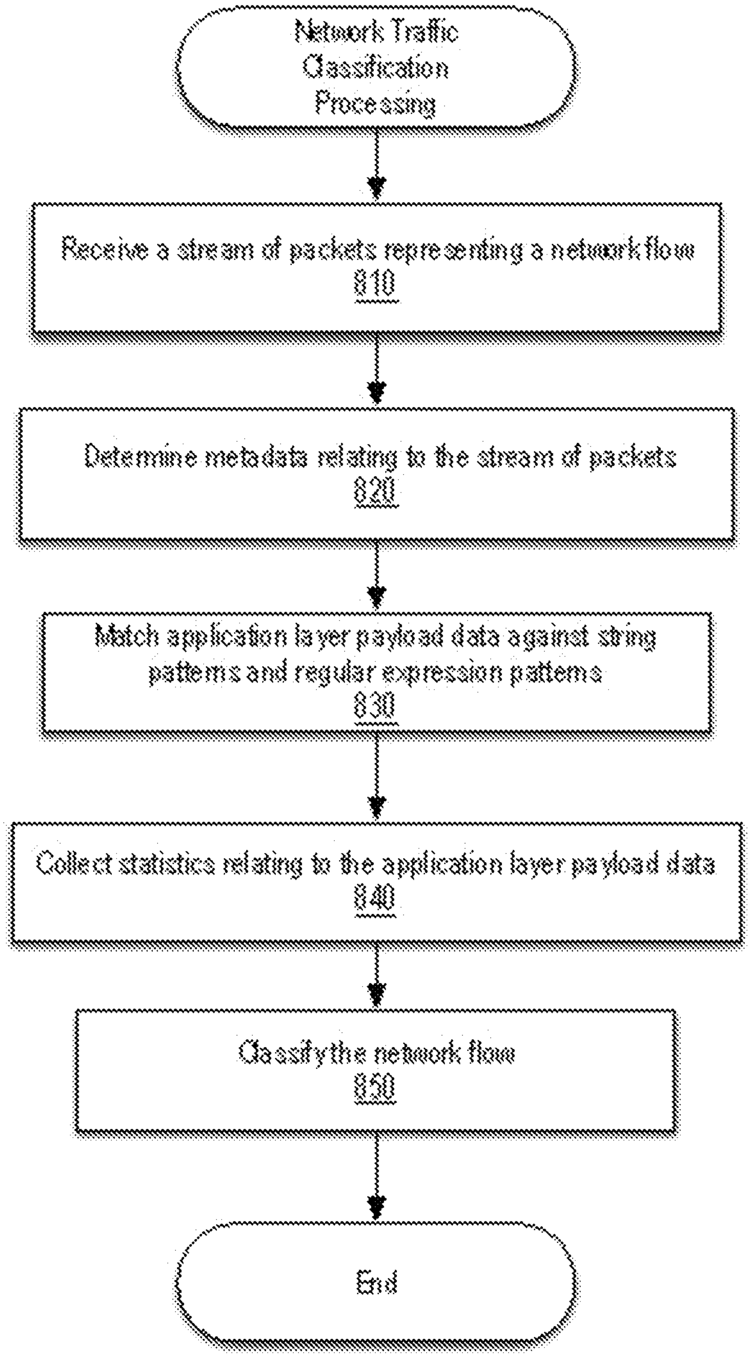
FIG. 8 is a flow diagram illustrating network traffic classification processing in accordance with an embodiment of the present invention.

FIG. 8 is a flow diagram 800 illustrating network traffic classification processing in accordance with an embodiment of the present invention. The processing described with reference to FIG. 8 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, this processing may be performed by one or more computer systems of various forms, such as the computer system 900 described with reference to FIG. 9 below.

In the context of the present example, at block 810, a stream of packets representing a network flow is received. For example, the stream of packets may be received by a processor of a network security device (e.g., network security device 102). Depending upon the particular implementation, the processor may be an embedded processor (e.g., embedded processor 154) of a NIC (e.g., NIC 152) or a general purpose processor (e.g., general purpose processor 104). In the case of the former, the NIC may provide traffic classification services on behalf of other host systems or network nodes operatively coupled with the NIC without using processing resources of the host processor of the network security device.

At block 820, metadata is determined relating to the stream of packets. For example, metadata may be collected during a TLS handshake stage (e.g., TLS handshake stage 314) and/or an encrypted data exchange stage (e.g., encrypted data exchange 316) and may include one or more of the types of metadata listed in Table 1.

At block 830, application layer payload data is matched against string patterns and regular expression patterns. Non-limiting examples of string patterns and regular expression patterns that may be applied to the application layer payload data are listed in Table 2. Depending upon the particular implementation, the matching may be performed by software running on a general purpose processor or may be accelerated by a pattern matching and regular expression matching module (e.g., pattern matching and regular expression matching module 502) of a hardware acceleration sub-system (e.g., hardware accelerator 116)

At block 840, statistics are collected relating to the application layer payload data. According to one embodiments, the statistics collection involves calculating the frequency of ASCII characters or ASCII character ranges occurring within the received stream of packets. Depending upon the particular implementation, the statistics collection may be performed by software running on a general purpose processor or may be accelerated by a statistics collection module (e.g., statistics collection module 504) of a hardware acceleration sub-system (e.g., hardware accelerator 116).

At block 850, the network flow is classified. According to one embodiment, the encrypted stream of packets is classified as being associated with a particular network service of multiple network services (e.g., a movie streaming service (e.g., Netflix, HBO GO, HBO NOW, Disney Plus, Hulu, Amazon Prime Video, Sling TV, Fubo TV, YouTube, etc.), a music streaming service (e.g., Amazon Music, Apple Music, Spotify, Google Play, etc.), or the like) by applying a machine-learning model to the metadata, results of the matching and the collected statistics.

Figure 9:
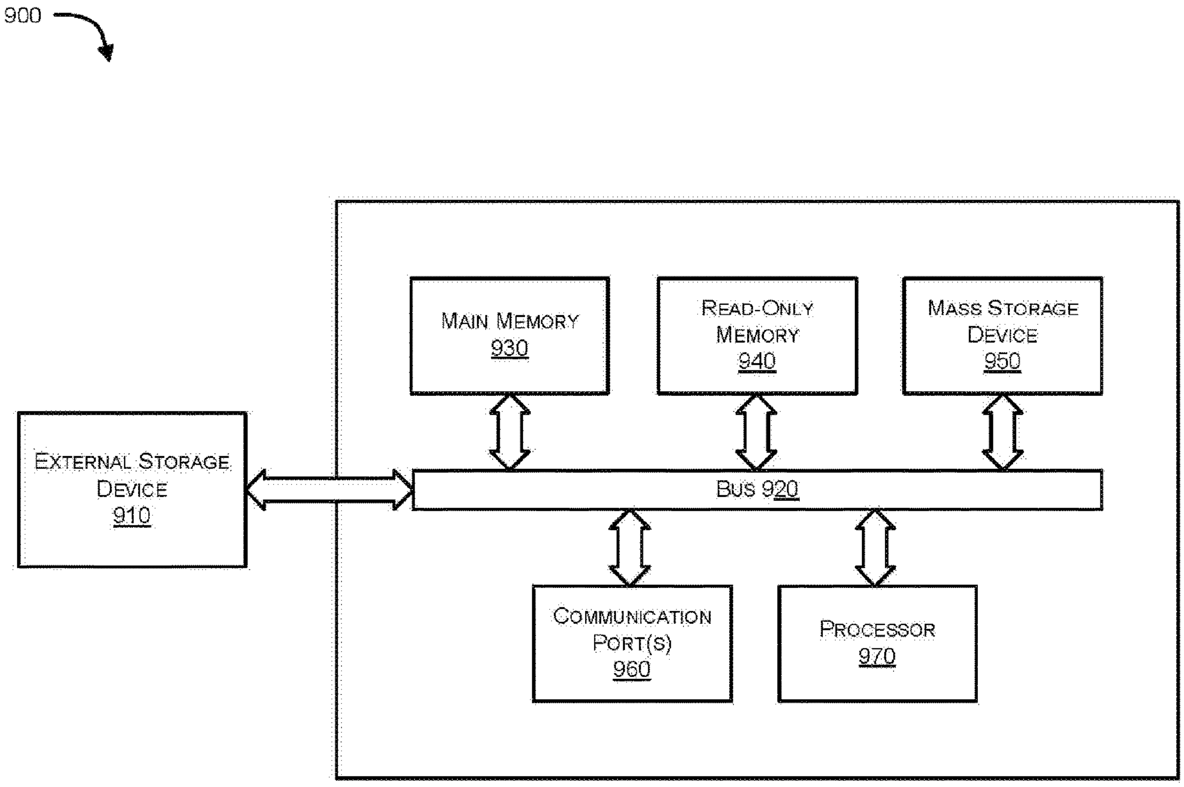
FIG. 9 illustrates an exemplary computer system in which or with which embodiment of the present invention may be utilized.

FIG. 9 illustrates an exemplary computer system 900 in which or with which embodiment of the present invention may be utilized. As shown in FIG. 9, computer system includes an external storage device 910, a bus 920, a main memory 930, a read only memory 940, a mass storage device 950, a communication port 960, and a processor 970. In one embodiment, computer system 900 may represent some portion of a network security device (e.g., network security device 102 of FIG. 1A and FIG. 1B).

Those skilled in the art will appreciate that computer system 900 may include more than one processor 970 and communication ports 960. Examples of processor 970 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 970 may include various modules associated with embodiments of the present invention.

Communication port 960 can be any of an RS-232 port for use with a modem based dialup connection, a 10/100 Ethernet port, a Gigabit or 10 Gigabit port using copper or fiber, a serial port, a parallel port, or other existing or future ports. Communication port 960 may be chosen depending on a network, such a Local Area Network (LAN), Wide Area Network (WAN), or any network to which computer system connects.

Memory 930 can be Random Access Memory (RAM), or any other dynamic storage device commonly known in the art. Read only memory 940 can be any static storage device(s) e.g., but not limited to, a Programmable Read Only Memory (PROM) chips for storing static information e.g. start-up or BIOS instructions for processor 970.

Mass storage 950 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 920 communicatively couples processor(s) 970 with the other memory, storage and communication blocks. Bus 920 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 970 to software system.

Optionally, operator and administrative interfaces, e.g. a display, keyboard, and a cursor control device, may also be coupled to bus 920 to support direct operator interaction with computer system. Other operator and administrative interfaces can be provided through network connections connected through communication port 960. External storage device 910 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

What is claimed is:

1. A method comprising:

receiving, by a processor of a network security device, a stream of packets representing a network flow, the network flow having a handshake stage and an encrypted data exchange stage;

collecting metadata and copying unencrypted payload data to a local memory during the handshake stage;

determining, by the processor, metadata relating to the stream of packets;

matching, by a pattern matching and regular expression matching module of a hardware acceleration sub-system of the network security device, the copied unencrypted application layer payload data of one or more packets of the stream of packets against string patterns and regular expression patterns;

applying, by the processor, a machine learning model to at least a portion of the metadata and results of said matching to generate a preliminary classification output and an associated classification confidence value;

collecting, by the hardware acceleration sub-system, statistics relating to the copied unencrypted application layer payload data when the classification confidence value satisfies a confidence threshold;

collecting, by the hardware acceleration sub-system, additional metadata when the classification confidence value does not satisfy the confidence threshold;

classifying, by the processor, the encrypted data of the network flow as being associated with a particular network service of a plurality of network services by applying a machine-learning model to the metadata, results of said matching, and the collected statistics to generate a classification corresponding to the preliminary classification output when the classification confidence value satisfies the confidence threshold;

determining, by the processor, a model skepticism value associated with the classification, the model skepticism value representing uncertainty of the machine learning model with respect to the classification;

comparing the model skepticism value to a skepticism threshold;

conditionally modifying the machine learning model only when the model skepticism value satisfies the skepticism threshold, wherein the modification comprises selectively retraining or adjusting the machine learning model based on the metadata, results of said matching, or collected statistics; and reporting a classification result as part of an encrypted data exchange when the classification is successful.

2. The method of claim 1, wherein the machine learning model comprises one or more of a decision tree model, a logistic regression model, and a neural network model.

3. The method of claim 2, wherein an output layer of the machine learning model outputs a classification of the network flow based on a highest score among predetermined confidence classification scores associated with the decision tree model, the logistic regression model, and the neural network model.

4. The method of claim 1, wherein the network security device is also operable to perform intrusion detection functionality and wherein the pattern matching and regular expression matching module is shared by network traffic classification functionality and the intrusion detection functionality.

5. The method of claim 1, wherein the metadata comprises any or a combination of a packet size sequence, an arrival interval sequence, an Internet Protocol (IP) family, and a layer four protocol associated with the network flow.

6. The method of claim 5, wherein the metadata further comprises any or a combination of a destination port specified by the layer four protocol, Transport Layer Security (TLS) records, and TLS hello message lengths.

7. The method of claim 5, wherein the packet size sequence comprises sizes of the application layer payload for a predetermined number of initial packets of the network flow.

8. A network security device comprising:

a hardware acceleration sub-system configured to:

perform pattern matching and regular expression matching of application layer payload data of received packets against string patterns and regular expression patterns; and collect statistics relating to the application layer payload data;

a processing resource; and a non-transitory computer-readable medium, coupled to the processing resource, having stored therein instructions that when executed by the processing resource cause the processing resource to:

receive a stream of packets representing a network flow, the network flow having a handshake stage and an encrypted data exchange stage;

collect metadata and copy unencrypted application layer payload data to a local memory during the handshake stage;

determine metadata relating to the stream of packets collected on a packet-by-packet basis;

match, by a pattern matching and regular expression matching module of a hardware acceleration sub-system of the network security device, the copied unencrypted application layer payload data of one or more packets of the stream of packets against string patterns and regular expression patterns;

apply a machine learning model to at least a portion of the metadata and results of said matching to generate a preliminary classification output and an associated classification confidence value;

collect, by the hardware acceleration sub-system, statistics relating to the copied unencrypted application layer payload data when a classification confidence value produced by satisfies a confidence threshold;

collect, by the hardware acceleration sub-system, additional metadata when the classification confidence value does not satisfy the confidence threshold;

classify the encrypted data of the network flow as being associated with a particular network service of a plurality of network services by applying a machine-learning model to the metadata, results of said matching, and the collected statistics to generate a classification corresponding to the preliminary classification output when the classification confidence value satisfies the confidence threshold;

determine a model skepticism value associated with the classification, the model skepticism value representing uncertainty of the machine learning model with respect to the classification;

compare the model skepticism value to a skepticism threshold;

conditionally modify the machine learning model only when the model skepticism value satisfies the skepticism threshold, wherein the modification comprises selectively retraining or adjusting the machine learning model based on the metadata, results of said matching, or collected statistics; and report a classification result as part of an encrypted data exchange when the classification is successful.

9. The network security device of claim 8, wherein the instructions that when executed by the processing resource further cause the processing resource to:

make use of the results of to perform pattern matching and regular expression matching to detect intrusion.

10. The network security device of claim 8, wherein the machine-learning module comprises a decision tree based model, a logistic regression model, and a neural network model.

11. The network security device of claim 8, wherein the hardware acceleration sub-system includes a decision tree co-processor, a multiply-accumulate co-processor, and a lookup table co-processor.

12. The network security device of claim 10, wherein the multiply-accumulate co-processor is shared by the logistic regression module and the neural network module.

13. The network security device of claim 8, wherein the hardware acceleration sub-system and the processing resource are implemented within a network interface card of the network security device.

14. The method of claim 1, wherein the metadata includes at least one of:

a packet size sequence;

an arrival interval sequence;

an internet protocol (IP) family;

a layer four protocol associated with the network flow;

a destination port specified by a layer four protocol associated with the network flow; and a packet size sequence including a size of an application layer payload.

15. The method of claim 1, wherein the statistics are specific to information included within the application layer payload data.

16. The method of claim 1, wherein the statistics comprise: a frequency of characters occurring within the application layer payload data.

17. The method of claim 1, wherein the statistics comprise: a frequency of character ranges occurring within the application layer payload data.

18. The method of claim 1, wherein the classifying yields a classification, and wherein the method further comprises:

reporting, by the processor, the classification.

19. The network security device of claim 8, wherein the metadata includes at least one of:

a packet size sequence;

an arrival interval sequence;

an internet protocol (IP) family;

a layer four protocol associated with the network flow;

a destination port specified by a layer four protocol associated with the network flow; and a packet size sequence including a size of an application layer payload.

20. The network security device of claim 8, wherein the statistics are specific to information included within the application layer payload data.

21. The network security device of claim 8, wherein the statistics comprise: a frequency of characters occurring within the application layer payload data.

22. The network security device of claim 8, wherein the statistics comprise: a frequency of character ranges occurring within the application layer payload data.

23. The network security device of claim 8, wherein the hardware acceleration sub-system is further configured to make use of the results of pattern matching and regular expression matching to detect intrusion.

24. The network security device of claim 8, wherein the classifying yields a classification further comprises reporting, by the processor, the classification.

* * * * *